US012054322B2

(12) United States Patent
Kuhn

(10) Patent No.: US 12,054,322 B2
(45) Date of Patent: Aug. 6, 2024

(54) PRODUCT DISPLAY WITH SELF-DEPLOYING HEADER

(71) Applicant: WestRock Container, LLC, Atlanta, GA (US)

(72) Inventor: Wayne H. Kuhn, Palos Park, IL (US)

(73) Assignee: WESTROCK CONTAINER, LLC, Atlanta, GA (US)

( * ) Notice: Subject to any disclaimer, the term of this patent is extended or adjusted under 35 U.S.C. 154(b) by 1123 days.

(21) Appl. No.: 16/525,743

(22) Filed: Jul. 30, 2019

(65) Prior Publication Data

US 2020/0031516 A1 Jan. 30, 2020

Related U.S. Application Data

(60) Provisional application No. 62/711,860, filed on Jul. 30, 2018.

(51) Int. Cl.

*B65D 5/52* (2006.01)
*A47F 5/11* (2006.01)
*B31D 1/00* (2017.01)
*B65D 5/42* (2006.01)

(52) U.S. Cl.

CPC ............ *B65D 5/5246* (2013.01); *A47F 5/114* (2013.01); *B31D 1/0043* (2013.01); *B65D 5/4204* (2013.01); *B65D 5/5286* (2013.01); *B65D 2519/00273* (2013.01)

(58) Field of Classification Search

CPC .. B65D 5/5246; B65D 5/4204; B65D 5/5286; B65D 5/522; B65D 5/5226; B65D 5/5233; B65D 5/524; B65D 5/4212; B65D 5/422; B65D 5/4225; B65D 5/4229; B65D 2519/00273; B65D 51/245; A47F 5/114; A47F 5/0018

See application file for complete search history.

(56) References Cited

U.S. PATENT DOCUMENTS 416,078 A * 11/1889 smith ................ B65D 5/46008 229/117.23
1,901,483 A * 3/1933 Ware, Jr. .................. B65D 5/22 206/745

(Continued)

FOREIGN PATENT DOCUMENTS

CA 3057340 A1 * 4/2020 ........... B65D 5/4225
DE 1312374 A * 6/1970 ........... B65D 5/5206

(Continued)

*Primary Examiner* — J. Gregory Pickett
*Assistant Examiner* — Abigail Elizabeth Guidry
(74) *Attorney, Agent, or Firm* — Neil G. Cohen; Rohini K. Garg

(57) ABSTRACT

A display system includes a tray portion configured to hold and display product and a display header which is movably coupled to the tray portion. The display header includes a header board connected to a header mount via a rigid stem. The display header is movable from a retracted shipping position to an extended display position. An actuator movably couples the header mount and the stem to a wall of the tray portion by applying a biasing force which automatically pivots the header mount and stem to an upright position thereby placing the display header into the extended display position.

10 Claims, 11 Drawing Sheets

(56) References Cited

U.S. PATENT DOCUMENTS

| | | | | |
|---|---|---|---|---|
| 1,949,376 A * | 2/1934 | Mansfield | B65D 5/526 | 206/767 |
| 2,561,488 A * | 7/1951 | Barker | A45C 3/00 | 40/632 |
| 2,753,103 A * | 7/1956 | Manizza | B65D 5/22 | 229/172 |
| 2,922,566 A * | 1/1960 | Wright | B65D 5/46056 | 229/117.26 |
| 2,992,768 A * | 7/1961 | Harry | B65D 33/12 | 383/92 |
| 3,417,910 A * | 12/1968 | Johnson | B65D 5/38 | 229/117.24 |
| 4,274,613 A * | 6/1981 | Taub | B65D 5/5206 | 248/150 |
| 4,732,269 A * | 3/1988 | Roy | A45C 11/16 | 206/751 |
| 4,813,536 A * | 3/1989 | Willis | B65D 5/5206 | 206/45.3 |
| 5,600,937 A * | 2/1997 | Erickson | A47F 5/0006 | 53/414 |
| 6,427,842 B1 * | 8/2002 | Green | B65D 75/32 | 53/442 |
| 6,837,378 B2 * | 1/2005 | Mason | A47F 5/112 | 206/745 |
| 6,926,192 B1 * | 8/2005 | Dowd | B65D 5/445 | 229/148 |
| 9,403,627 B1 * | 8/2016 | Scott | B65D 5/6673 | |
| 10,016,074 B1 * | 7/2018 | Finnegan | B65D 25/205 | |
| 11,286,080 B1 * | 3/2022 | Graham | A47F 5/112 | |
| 2005/0161413 A1 * | 7/2005 | Close | G09F 11/30 | 211/51 |
| 2008/0060975 A1 * | 3/2008 | Young | B65D 11/12 | 206/745 |
| 2013/0316613 A1 * | 11/2013 | O'Hare | A63H 33/42 | 446/487 |
| 2014/0238895 A1 * | 8/2014 | Bojie | B65D 19/38 | 206/597 |
| 2014/0346069 A1 * | 11/2014 | Pavlu, Jr. | B65D 5/425 | 206/423 |
| 2015/0284134 A1 * | 10/2015 | Kreutzer | B65D 5/4204 | 229/162.1 |
| 2017/0066556 A1 * | 3/2017 | Liu | B65D 85/20 | |
| 2017/0238727 A1 * | 8/2017 | Ertl | G09F 5/02 | |
| 2019/0185200 A1 * | 6/2019 | Ertl | B65D 5/5213 | |
| 2020/0231329 A1 * | 7/2020 | Cline | B65D 85/30 | |
| 2021/0300672 A1 * | 9/2021 | dacosta | A47F 7/08 | |

FOREIGN PATENT DOCUMENTS

| | | | |
|---|---|---|---|
| DE | 3941111 A1 * | 12/1989 | A47F 5/114 |
| DE | 29621214 U1 * | 2/1997 | B65D 5/5246 |

* cited by examiner

PRODUCT DISPLAY WITH SELF-DEPLOYING HEADER

CROSS-REFERENCE TO RELATED APPLICATIONS

This application claims the benefit of priority from U.S. Provisional Application No. 62/711,860, filed Jul. 30, 2018, the entire contents of which are incorporated herein by reference.

BACKGROUND

The present disclosure relates to a product display, and particularly to a product display having a display header and a tray. More particularly, the present disclosure relates to a product display having a display header attached to a tray for showing product indicia related to products stored in the tray to a customer at a retail location.

SUMMARY

A product display in accordance with the present disclosure includes a display header and a tray. The display header is coupled to the tray for showing product indicia related to products stored in the tray to a customer at a retail location.

In illustrative embodiments, the display header includes a header board and a header mount. The header mount is coupled to the tray to support the header board on the tray. Product indicia is located on a front side of the header board. The header board is pivotally movable from a retracted shipping position to an extended display position relative to the tray. Product indicia is obscured from view when the header board is in the retracted shipping position and is visible when the header board is in the extended display position.

In illustrative embodiments, the header mount is slidably coupled to the tray for movement of the header board from the retracted shipping position to the extended display position by an actuator. The header mount retains the header board in the extended display position without any assistance from the actuator.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 9:
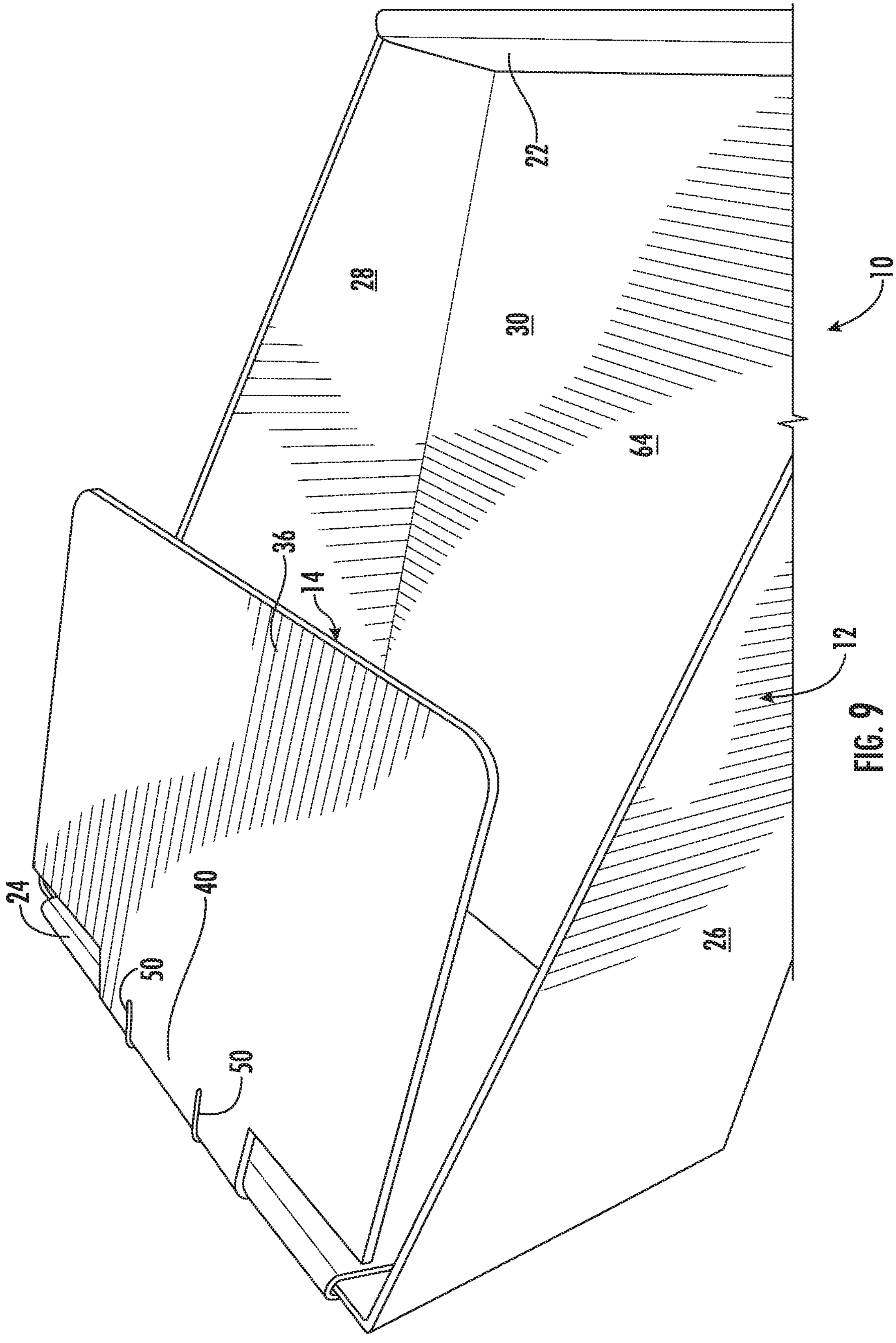
Figure 10:
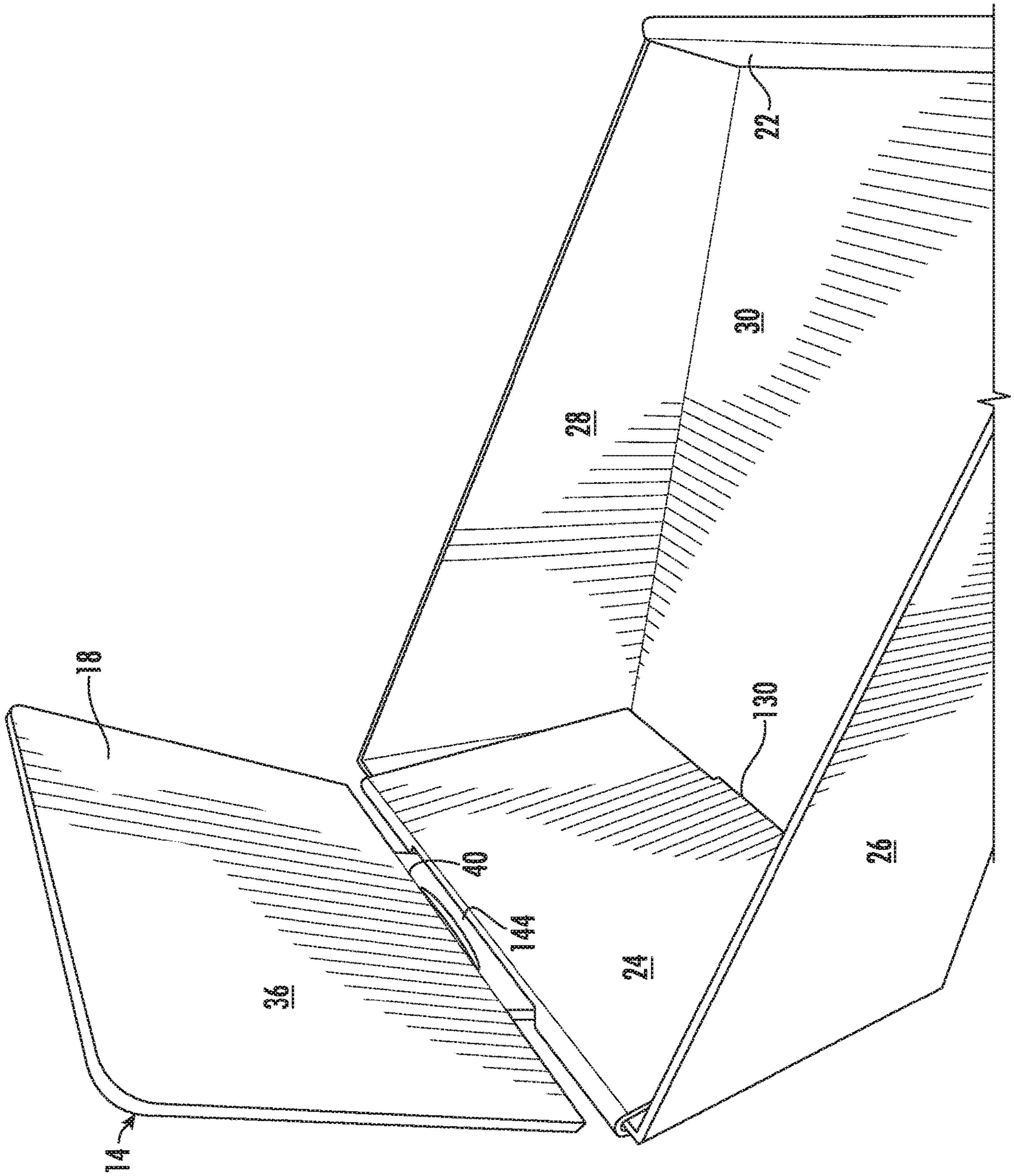
Figure 11:
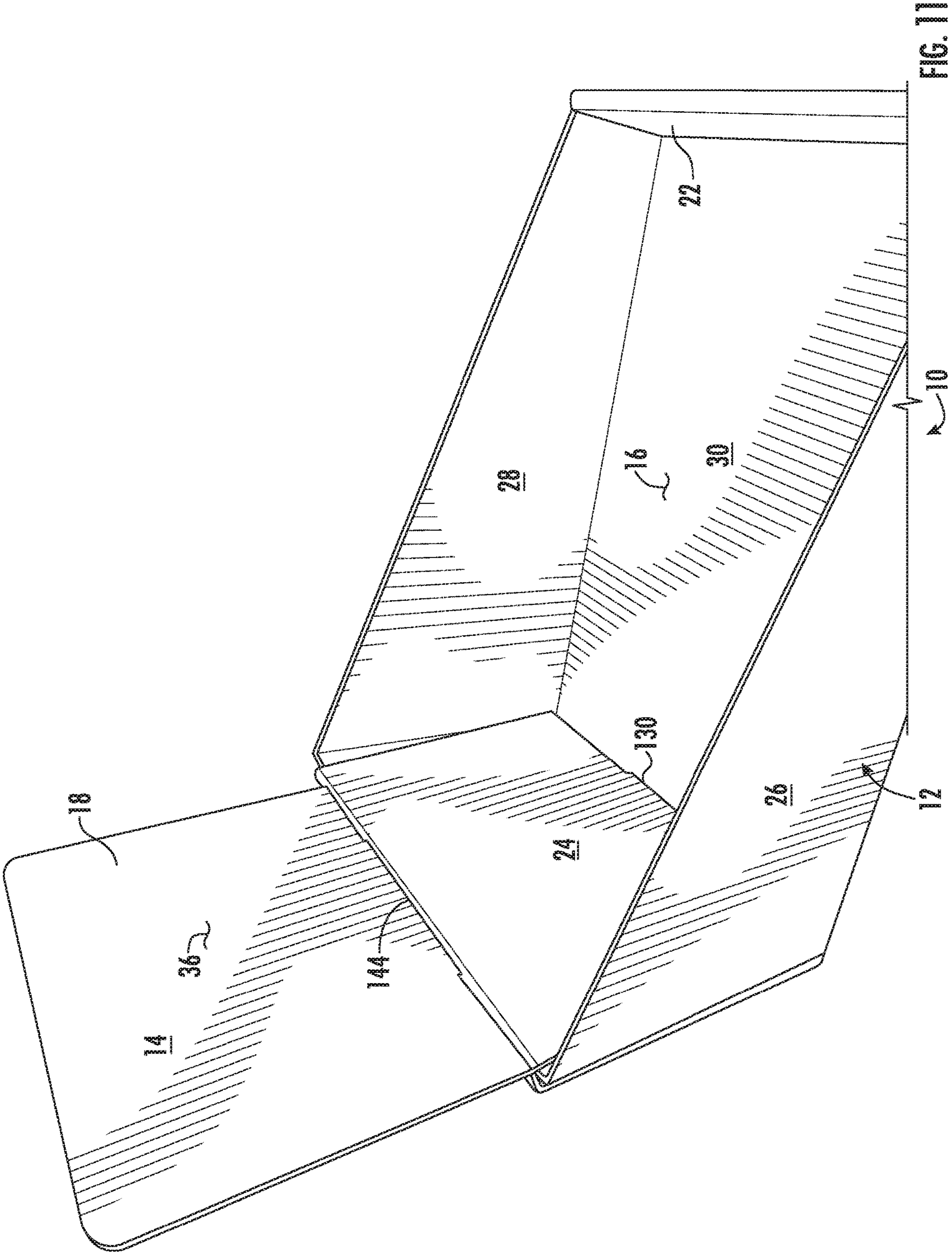
Figure 12:
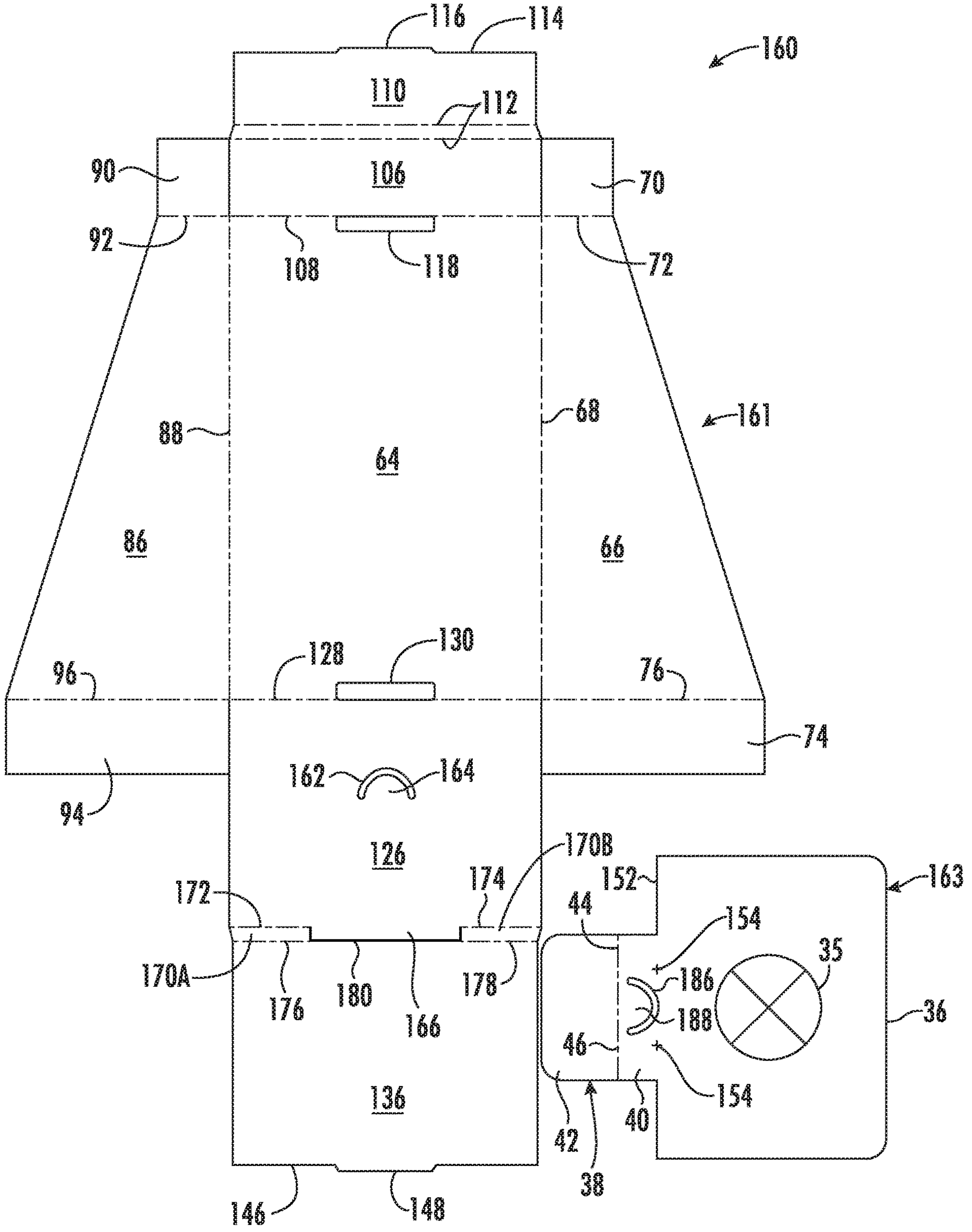

FIGS. 9-11 are a series of views showing a process in accordance with the present disclosure for pivotable movement of the header board of the header display from the retracted shipping position as shown in FIG. 9 to the extended display position as shown in FIG. 11; and FIG. 12 is a top plan view of another embodiment of a blank for forming a tray and a display header of the product display in accordance with the present disclosure.

DETAILED DESCRIPTION

A product display 10 in accordance with the present disclosure is shown in

Figure 1:
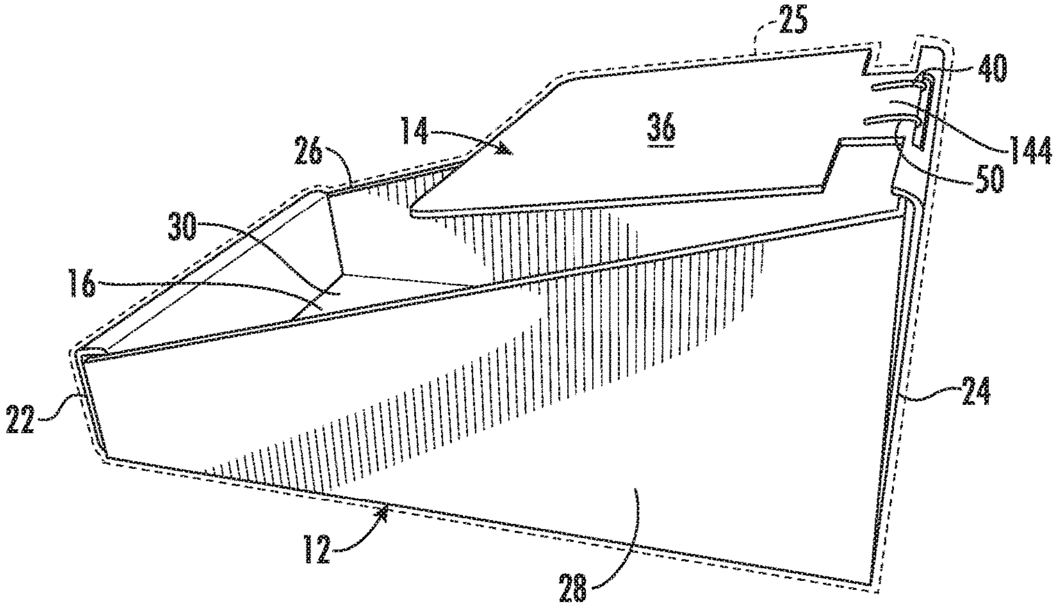
FIG. 1 is a side perspective view of a product display in accordance with the present disclosure showing that the product display includes a display header coupled to a tray for showing product indicia related to products stored in the tray to a customer at a retail location and with a header board of the display header shown in the retracted shipping position.
Figure 2:
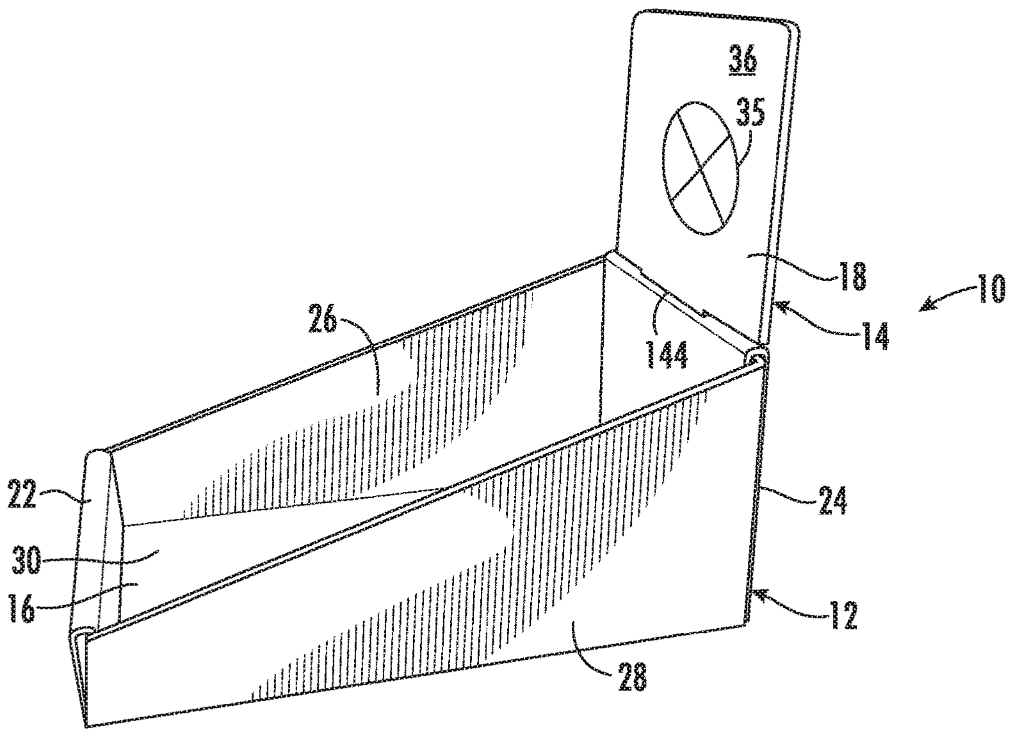
FIG. 2 is similar to the view in FIG. 1 showing the header board of the display header coupled to the tray in an extended display position for showing product indicia related to the products stored in the tray to a customer at a retail location.

FIGS. 1 and 2. Product display 10 includes a product support structure, such as a tray 12, and a display header 14 movably coupled to tray 12. Header display 14 is automatically movable with respect to tray 12 from a retracted shipping position as shown in FIG. 1 to an extended display position as shown in FIG. 2. Tray 12 is configured to support one or more products in a product-storage region 16 for display in a retail setting. Display header 14 includes a product indicia display area 18 on a front side of display header 14 for displaying product indicia 35 related to products stored in tray 12 when display header 14 is located in the extended display position as shown in FIG. 2. Product display 10 is sized to fit on a shelf or a counter-top, for example, at the retail location.

Tray 12 includes a front wall 22, a back wall 24 spaced apart from and generally parallel to front wall 22, a left side wall 26 and a right side wall 28 spaced apart from and generally parallel to left side wall 26. Tray 12 also includes a floor 30 that extends between the bottom ends of walls 22, 24, 26 and 28. Walls 22, 24, 26 and 28 and the floor 30 define product-storage region 16.

Display header 14 includes a header board 36 and a header mount 38 coupled to header board 36. Header board 36 includes product indicia display area 18. Header mount 38 includes a stem 40 rigidly coupled to a bottom end of header board 36 and a base member 42 coupled to a bottom end of stem 40 along a fold line 44 that forms a pivotable hinge having a pivot axis 46 that extends along fold line 44.

Header mount 38 movably couples header board 36 to the top end of back wall 24 of tray 12. As shown in FIG. 1, when header board 36 of display header 14 is in the retracted shipping position, header board 36 is generally horizontal and parallel to floor 30 of tray 12 and stem 40 of header mount 38 extends generally horizontally between the bottom end of header board 36 and the top end of back wall 24 of tray 12 generally coplanar with header board 36. Base member 42 of header mount 38 is movably coupled to back wall 24 of tray 12 and is located generally vertically and generally at a right angle to stem 40.

An actuator, such as an elastic member 50 movably couples stem 40 of header mount 38 to back wall 24 of tray 12. Elastic member 50 may comprise an elastic cord having barbs attached to opposing ends thereof for securing elastic member 50 to tray 12, or an endless generally circular and flexible elastic ring or band, such as a rubber band. When display header 14 is in the retracted shipping position as shown in FIG. 1, elastic member 50 resiliently biases header board 36 and stem 40 of header mount 38 to pivot about fold line 44 and pivot axis 46 from the retracted shipping position as shown in FIG. 1 to an upright position where header board 36 and stem 40 of header mount 38 are generally vertical and generally coplanar with base member 42 of header mount 38 and generally coplanar with back wall 24 of tray 12. Elastic member 50 then resiliently biases header board 36 and header mount 38 to slide downwardly toward floor 30 of tray 12 with respect to back wall 24 of tray 12 until the bottom edge of header board 36 engages the top end of back wall 24 of tray 12 whereupon stem 40 of header mount 38 is coupled to back wall 24 of tray 12 in the extended display position. The coupling of stem 40 of header mount 38 to back wall 24 of tray 12 rigidly fixes header board 36 in the extended display position with respect to tray 12 as shown in FIG. 2.

When header board 36 is in the extended display position, and stem 40 of header mount 38 is coupled to back wall 24 of tray 12, stem 40 will maintain header board 36 in the extended display position without any assistance from elastic member 50. The biasing force applied to stem 40 of header mount 38 automatically pivots header mount 38 and stem 40 to the upright position, and automatically moves header board 36 and header mount 38 to the extended display position.

Header board 36 can be selectively moved from the extended display position as shown in FIG. 2 to the retracted shipping position as shown in FIG. 1 by manually pulling upwardly on header board 36 and thereby removing stem 40 of header mount 38 from its coupling with back wall 24 of tray 12, and then pivoting header board 36 and stem 40 of header mount 38 along fold line 44 and about pivot axis 46 to the retracted shipping position as shown in FIG. 1. Header board 36 may be restrained from pivotal movement from the retracted shipping position to the extended display position such as by surrounding product display 10, with header board 36 in the retracted shipping position, within an external casing 25, such as a shipping container or packaging. When the external casing 25 is removed from the product display 10, header board 36 automatically self-deploys from the retracted shipping position as shown in FIG. 1 to the extended display position as shown in FIG. 2. The height of product display 10 when header board 36 is in the retracted shipping position is shorter than the height of product display 10 when header board 36 is in the extended display position, by approximately the height of header board 36 between the bottom end and a top end of header board 36.

Figure 3:
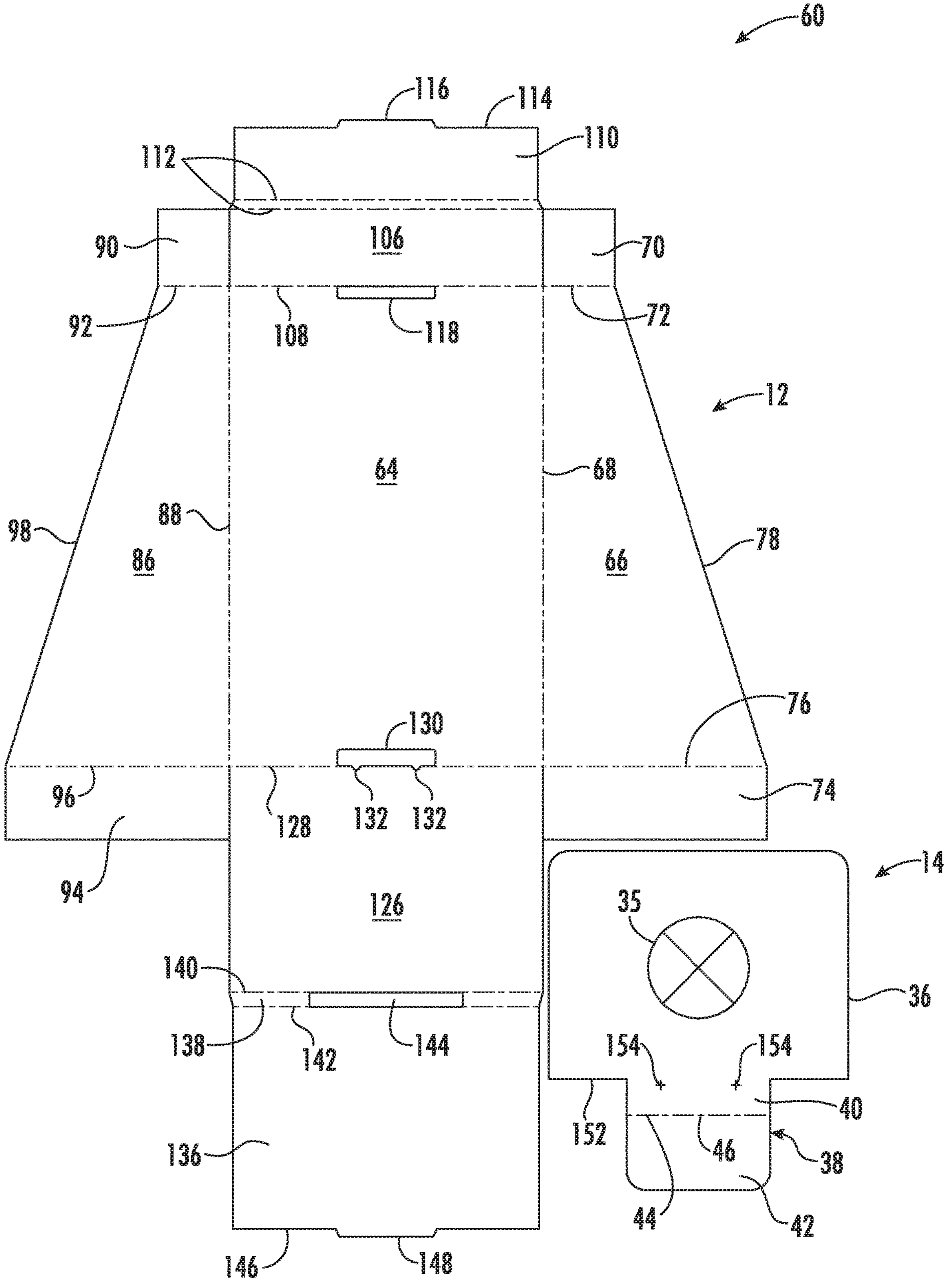
FIG. 3 is a top plan view of one embodiment of a blank in accordance with the present disclosure used to form the tray and display header of the product display of FIG. 1.

One embodiment of a blank 60 in accordance with the present disclosure used to form tray 12 and display header 14 is shown in FIG. 3. As shown and described herein, when making reference to a blank of material, solid lines denote a cut line where adjacent portions of material are severed from one another and dashed lines denote a fold line where portions of material are adapted to be folded relative to one another. In some examples, fold lines are scored or perforated. It is within the scope of the present disclosure to make blanks from a variety of materials including corrugated paperboard, folding carton, solid fiber, plastic sheeting, plastic corrugated, combinations thereof, or any other suitable material.

Blank 60 is generally planar and includes an inside surface and an outside surface. Blank 60 includes a tray blank portion for forming tray 12 and a display header blank portion that forms display header 14. The tray blank portion of blank 60 that forms tray 12 includes a generally rectangular floor panel 64, and a left side wall panel 66 coupled to floor panel 64 along a fold line 68. A generally rectangular front flap 70 is coupled to a front end of left side wall panel 66 along a fold line 72, and a generally rectangular rear flap 74 is coupled to a rear end of left side wall panel 66 along a fold line 76. Left side wall panel 66 includes a free edge 78 that extends from an outer end of fold line 72 to an outer end of fold line 76 at an acute angle with respect to fold line 68.

A right side wall panel 86 is coupled to floor panel 64 along a fold line 88. Fold line 88 is spaced apart from and generally parallel to fold line 68. A generally rectangular front flap 90 is coupled to a front end of right side wall panel 86 along a fold line 92 that is generally colinear with fold line 72. A generally rectangular rear flap 94 is coupled to a rear end of right side wall panel 86 along a fold line 96 that is generally colinear with fold line 76. A generally linear free edge 98 extends between the outer end of fold line 92 and the outer end of fold line 96 at an acute angle to fold line 88.

A generally rectangular front wall panel 106 is coupled to a front end of floor panel 64 along a fold line 108. Fold line 108 is generally colinear with fold lines 72 and 92. A generally rectangular front flap 110 is coupled to the outer end of front wall panel 106 by one or more fold lines 112. Fold lines 112 are spaced apart from and generally parallel to fold line 108. Front flap 110 includes a free edge 114 spaced apart from and generally parallel to fold line 112. Free edge 114 of front flap 110 includes an outwardly extending locking tab 116. Floor panel 64 includes an elongate generally rectangular slot 118 that extends adjacent to and along fold line 108. Slot 118 is adapted to receive locking tab 116 of front flap 110.

A generally rectangular rear wall panel 126 is coupled to the rear end of floor panel 64 along a fold line 128. Fold line 128 is generally colinear with fold lines 76 and 96. Floor panel 64 includes an elongate generally rectangular slot 130 that extends along and adjacent to fold line 128. Rear wall panel 126 includes a plurality of spaced apart notches 132 adjacent to fold line 128 that are in communication with slot 130.

A generally rectangular rear flap 136 is coupled to the outer end of rear wall panel 126 by a connector member 138. Connector member 138 is coupled to the outer end of rear wall panel 126 along a fold line 140. Fold line 140 is generally parallel to fold line 128. Rear flap 136 is coupled to connector member 138 along a fold line 142 that is spaced apart from and generally parallel to fold line 140. An elongate generally rectangular slot 144 is formed in connector member 138 between fold lines 140 and 142. Rear flap 136 includes an outer free edge 146 spaced apart from and generally parallel to fold lines 140 and 142. Free edge 146 of rear flap 136 includes a locking tab 148 that is adapted to be inserted into slot 130 of floor panel 64.

As shown in FIG. 3, blank 60 includes a portion that forms display header 14. The bottom end of header board 36 of display header 14 includes a bottom edge 152 that is adapted to engage the top end of back wall 24 of tray 12 when header board 36 is in the extended display position. Stem 40 of header mount 38 of display header 14 includes a plurality of spaced apart apertures 154 that are each adapted to receive a respective end of elastic member 50. Stem 40 of header mount 38 is rigidly attached to bottom end of header board 36.

Figure 4:
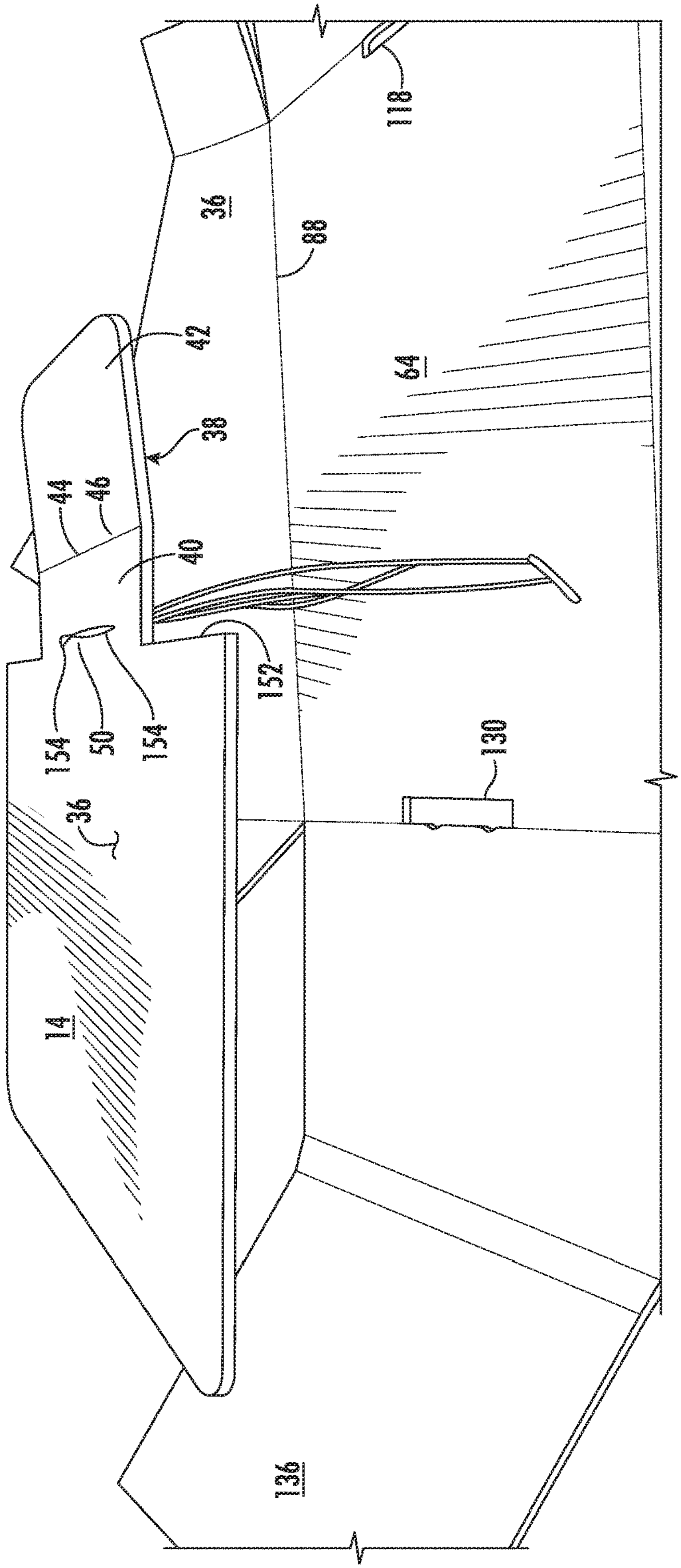
FIGS. 4-6 are a series of views showing a process in accordance with the present disclosure for coupling the display header to the tray blank of FIG. 3.

One illustrative process for forming tray 12 from blank 60 and for the coupling of display header 14 to tray 12 with elastic member 50 is shown in FIG. 4. Opposing ends of elastic member 50 are respectively threaded through the two spaced apart apertures 154 in stem 40 of header mount 38 of display header 14. A center portion of elastic member 50 extends between the spaced apart apertures 154 across the front of display header 14, and the ends of elastic member 50 extend outwardly from the rear of display header 14.

Figure 5:
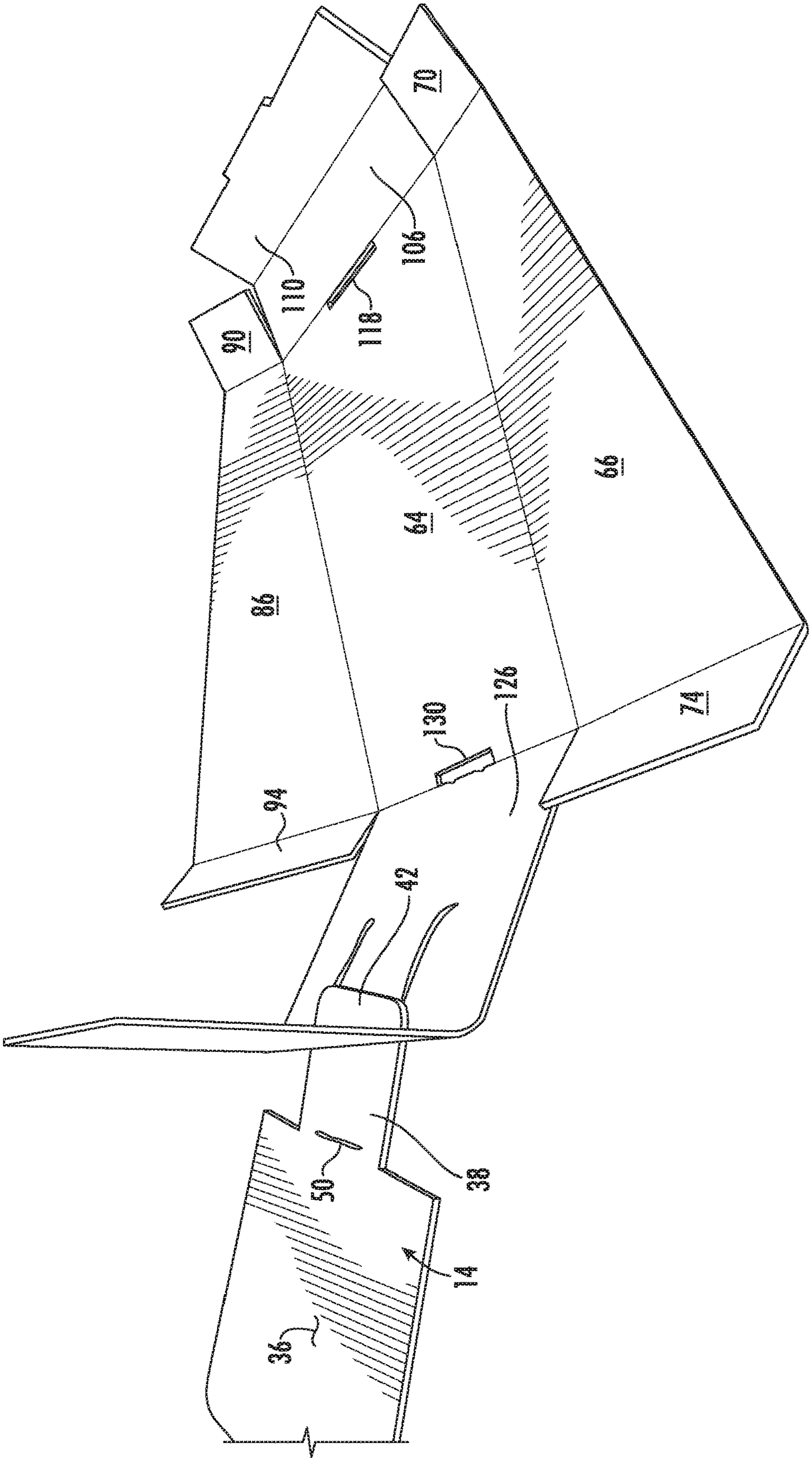
Figure 6:
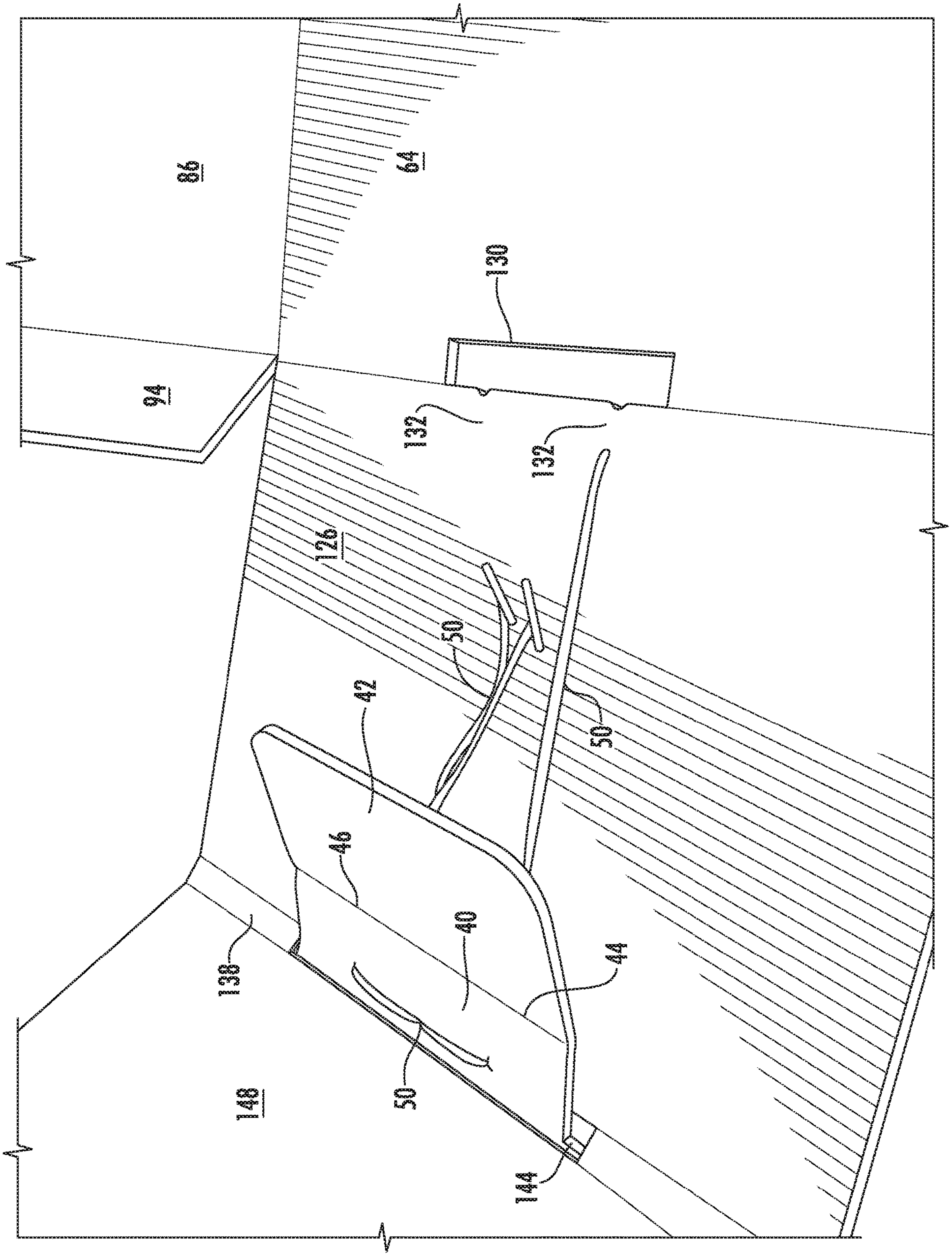
Figure 7:
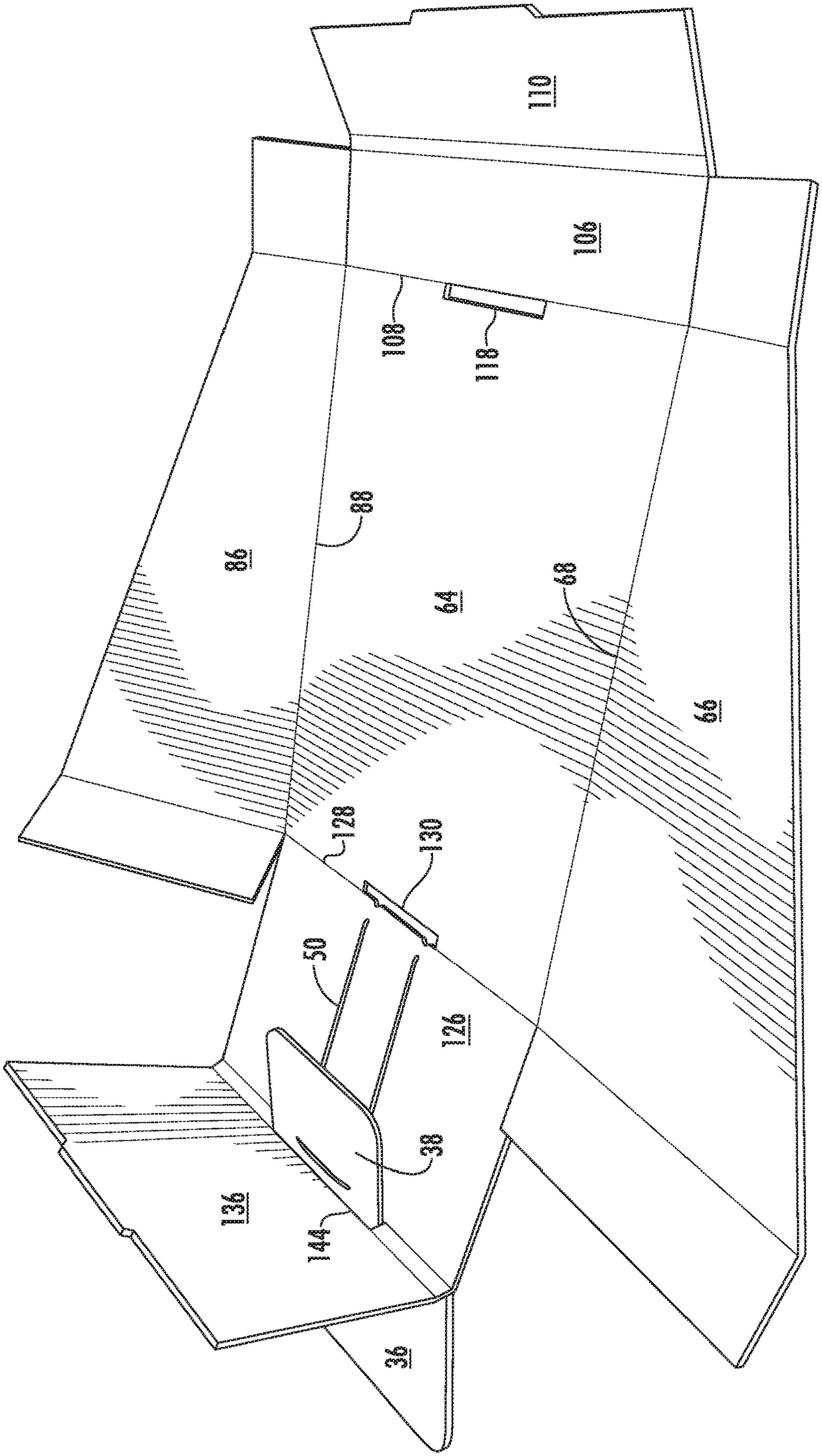
FIGS. 7-8 are a series of views showing a process in accordance with the present disclosure for forming the tray from the tray blank of FIG. 3 with the display header coupled to the tray blank.

As shown in FIG. 5, rear flap 136 is partially folded along fold lines 138 and 140. Header mount 38 is inserted through slot 144 of connector member 138 from the outside surface of blank 60. As shown in FIGS. 6 and 7, the opposing ends of elastic member 50 are inserted into respective notches 132 adjacent to slot 130 such that the barbs on the ends of elastic member 50 couple the ends of elastic member 50 to the inner end of rear wall panel 126. One or more elastic members 50 can be used to couple header mount 38 to rear wall panel 126 as desired.

Front flap 70 is folded upwardly along fold line 72 and rear flap 74 is folded upwardly along fold line 76 such that they are generally parallel to one another and generally transverse to left side wall panel 66. Front flap 90 is folded upwardly along fold line 92 and rear flap 94 is folded upwardly along fold line 96 such that they are generally parallel to one another and generally transverse to right side wall panel 86. Left side wall panel 66 is folded upwardly along fold line 68 and right side wall panel 86 is folded upwardly along fold line 88 to generally vertical positions generally parallel to one another and transverse to floor panel 64. The bottom edges of front flaps 70 and 90 extend along and adjacent to fold line 108, and the bottom edges of rear flaps 74 and 94 extend along and adjacent to fold line 128.

Front wall panel 106 is folded upwardly along fold line 108 and front flap 110 is folded along fold lines 112 over the top ends of front flaps 70 and 90, such that front flaps 70 and 90 are trapped between front wall panel 106 and front flap 110. Locking tab 116 of front flap 110 is inserted into slot 118 of floor panel 64 to lock front flap 110 in place.

Figure 8:
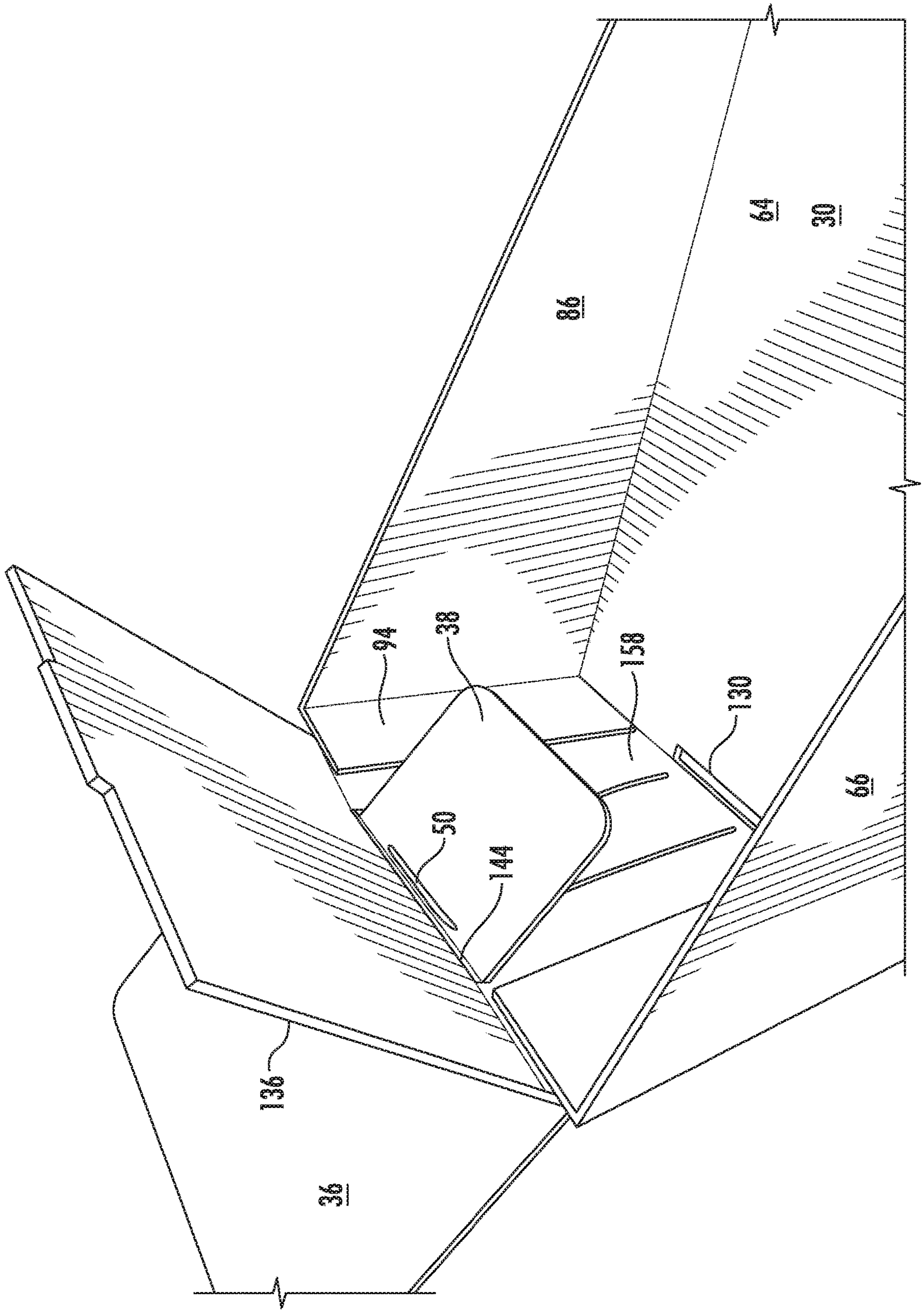

Rear wall panel 126 is folded upwardly along fold line 128 to a generally vertical position as shown in FIG. 8 generally perpendicular to floor panel 64. Rear flap 136 is folded along fold lines 140 and 142 and over rear flaps 74 and 94 such that rear flaps 74 and 94 are trapped between rear wall panel 126 and rear flap 136. Locking tab 148 of rear flap 136 is inserted into slot 130 of floor panel 64 to lock rear flap 136 in place. Connector member 138 extends along the top end of back wall 24 of tray 12.

Rear flap 136 is spaced apart from rear wall panel 126 by rear flaps 74 and 94, and the edges of rear flaps 74 and 94 are spaced apart from one another, such that a mounting pocket 158 is formed therebetween that is in communication with slot 144. Header mount 38 of display header 14 is located within mounting pocket 158. Mounting pocket 158 is located within back wall 24 of tray 12, and slot 144 is located in the top end of back wall 24 of tray 12. Elastic member 50 resiliently biases header mount 38 to slide downwardly with respect to the top end of back wall 24 of tray 12 toward floor panel 64 and into mounting pocket 158.

Display header 14 is manually movable from the extended display position to the retracted shipping position. Display header 14 can be manually lifted upwardly with respect to back wall 24 of tray 12 such that stem 40 of header mount 38 is located above the top end of back wall 24, thereby stretching elastic member 50. Header board 36 and stem 40 of header mount 38 may then be folded or pivoted along fold line 44 and pivot axis 46 to a generally horizontal retracted shipping position, as shown in FIG. 9, generally parallel to floor panel 64. In order to retain display header 14 in the retracted shipping position, a retention force must be applied to header board 36. The retention force may be applied by a retention member such as a casing 25 that encloses the product display 10, for example, a cardboard carton or plastic packaging material.

As suggested in FIGS. 10 and 11, when the retention force is released from header board 36, elastic member 50 automatically pivots header board 36 and stem 40 of header mount 38 along fold line 44 and pivot axis 46 to a generally upright position generally coplanar with base member 42 of header mount 38 and back wall 24 of tray 12. Elastic member 50 then automatically slides stem 40 of header mount 38 downwardly through slot 144 into the mounting pocket 158 of back wall 24 of tray 12 until the bottom edge 152 of header board 36 engages the top end of back wall 24 of tray 12. Stem 40 of header mount 38 is thereby rigidly coupled to back wall 24 of tray 12 between rear wall panel 126 and rear flap 136 to maintain display header 14 in the extended display position, without any assistance from elastic member 50. Any stretching, loss of resiliency, or breakage of elastic member 50 will not adversely affect the positioning of the display header 14 in the extended display position after the display header 14 is moved into the extended display position.

When display header 14 is moved to the retracted shipping position, an outer casing 25 is positioned to surround product display 10 to form a transport package and to retain the product in tray 12 and hold display header 14 in the retracted shipping position during transport of product display 10 to a retail location. The user of product display 10 removes the outer casing 25 to expose the product stored in tray 14 and elastic member 50 automatically moves display header 14 from the retracted shipping position to the extended display position for use in a retail location.

Another embodiment of a blank 160 used to form a tray 161 and a display header 163 for a product display in accordance with the present disclosure is shown in FIG. 12. Blank 160 includes a tray blank portion for forming tray 161 and a display header blank portion that forms display header 163. Blank 160 is constructed similarly to blank 60 of FIG. 3 and elements of blank 60 that are similarly included in blank 160 are identified with the same reference number in FIG. 12.

The tray like portion of blank 160 that forms tray 161 includes a generally rectangular floor panel 64, and a generally rectangular rear wall panel 126 coupled to a rear end of floor panel 64 along fold line 128. Rear wall panel 126 includes a curved generally semi-circular or C-shaped slot 162 that forms a tab 164 in rear wall panel 126. Slot 162 may be formed in other configurations for forming tab 164. Tab 164 extends from a fixed base to a tip at a free outer end. The tip of tab 164 is located more closely adjacent to fold line 128 than is the base of tab 164. Tab 164 thereby extends toward fold line 128. The outer end of rear wall panel 126 includes an elongate generally rectangular projection 166.

A generally rectangular rear flap 136 is coupled to the outer end of rear wall panel 126 by spaced apart connector members 170A-B. Connector member 170A is coupled to the outer end of rear wall panel 126 along a generally linear fold line 172. Connector member 170B is coupled to the outer end of rear wall panel 126 along a generally linear fold line 174. Fold lines 172 and 174 are generally coaxial with one another and are spaced apart from one another. Fold lines 172 and 174 are located on opposite sides of projection 166 of rear wall panel 126. Fold lines 172 and 174 are generally parallel to and spaced apart from fold line 128.

Rear flap 136 is coupled to connector member 170A along a fold line 176 that is spaced apart from and generally parallel to fold line 172. Rear flap 136 is coupled to connector member 170B along a fold line 178 that is spaced apart from and generally parallel to fold line 174. Fold lines 176 and 178 are generally coaxial with one another and are spaced apart from one another. Fold lines 176 and 178 are located on opposite sides of projection 166 of rear wall panel 126. A cut line 180 extends generally linearly between and coaxially with fold lines 176 and 178. Cut line 180 separates projection 166 of rear wall panel 126 from rear flap 136. Connector members 170A-B are located on opposite sides of projection 166 of rear wall panel 126.

As shown in FIG. 12, blank 160 includes a portion that forms display header 163. Display header 163 includes header board 36 and header mount 38 coupled to header board 36. Header mount 38 includes a stem 40 rigidly coupled to header board 36. Stem 40 of header mount 38 includes a curved generally semi-circular or C-shaped slot 186 that forms a tab 188 in stem 40. Slot 186 may be formed in other configurations for forming tab 188. Tab 188 includes a fixed base and a free outer end having a tip. The tip of tab 188 is located further from the fold line 144 than is the base of tab 188. Tab 188 thereby extends away from base member 42 of header mount 38 toward header board 36. While slot 186 and tab 188 are shown as being formed in stem 40 of header mount 38, slot 186 and tab 188 may alternatively be formed in header board 36 or in both stem 40 and header board 36. If desired, stem 40 of header mount 38 of display header 14 may also include a plurality of spaced apart apertures 154.

One process for forming tray 161 from blank 160 and for the coupling of display header 163 to tray 161, includes inserting a portion of an endless elastic ring or band, such as a rubber band, through slot 162 in rear wall panel 126. The elastic band extends around tab 164, and tab 164 is located between opposing portions of the elastic band, such that the elastic band is coupled to tab 164. The elastic band is also inserted through slot 186 of display header 163 such that the elastic band extends around tab 188 and opposing portions of the elastic band are located on opposite sides of tab 188, such that the elastic band is coupled to tab 188.

Tray 161 is assembled from blank 160 in generally the same manner as tray 14 is assembled from blank 60. In particular, rear wall panel 126 is folded upwardly along fold line 128 to a generally vertical position generally perpendicular to floor panel 64. Rear flap 136 is folded along fold lines 172, 174, 176 and 178 with respect to rear wall panel 126 such that rear flap 74 and 94 that are connected to left side wall panel 66 and right side wall panel 86 are trapped between rear wall panel 126 and rear flap 136, with projection 166 of rear wall panel 126 projecting upwardly above the top edge of rear flap 136 that is formed by cut line 180.

Mounting pocket 158 is formed between the rear flap 136 and the rear wall panel 126 and between the edges of the rear flaps 74 and 94. Slot 144 is formed between connector members 170A and 170B and between the top end of rear flap 136 as formed by cut line 180 and projection 166 of rear wall panel 126. Header mount 38 of display header 163 is located within mounting pocket 158. The elastic band resiliently biases header mount 38 to slide downwardly with respect to the top end of back wall 24 of tray 161 toward floor panel 64 and into mounting pocket 158.

Display header 163 is operable in connection with tray 161 in the same manner as display header 14 is operable in connection with tray. The elastic band operates in connection with display header 163 and tray 161 in the same general manner as the elastic cord operates in connection with display header 14 and tray 12 formed by the blank 60 of FIG. 3.

If desired, an elongate elastic cord, having a barb at each end, can be used in connection with the display header 163 and tray 161 formed from blank 160 of FIG. 12. The ends of the elastic cord are threaded through the apertures 154 of stem 40 of header mount 38 such that the ends are coupled to display header 163, and the middle portion of the elastic cord is inserted through slot 162 of rear wall panel 126 such that the elastic cord extends around and is coupled to tab 164.

The product display formed by tray 16 and display header 163 from blank 160 of FIG. 12, coupled to one another by an elastic band or a cord, operates in the same manner as the tray 12 and display header 14 formed from blank 60.

What is claimed is:

1. A display system comprising:

a tray portion configured for holding and displaying a product; and a display header movably coupled to the tray portion, wherein the display header includes a header board connected to a header mount via a stem, wherein the stem comprises at least two spaced apart apertures, an actuator movably coupled to the header mount and the stem, wherein the actuator comprises two opposing ends, wherein each of the at least two spaced apart apertures are each adapted to receive a respective end of the actuator, wherein the display header is movable from a retracted shipping position to an extended display position; and wherein the actuator movably couples the header mount and the stem to a wall of the tray portion by applying a biasing force which automatically pivots the header mount and the stem to an upright position thereby placing the display header into the extended display position.

2. The display system according to claim 1, wherein the display header includes a product indicia display area, wherein the product indicia relates to products stored in the tray portion.

3. The display system according to claim 1, wherein the display system is sized to fit on a shelf or a countertop at a retail location.

4. The display system according to claim 1, wherein the actuator is an elastic member.

5. The display system according to claim 4, wherein the elastic member is an elastic cord with a barb attached to each respective end to secure the elastic cord to the tray portion.

6. The display system according to claim 1, wherein the biasing force causes the header board and stem to pivot about a pivot axis to an upright position.

7. The display system according to claim 1, wherein the actuator applies the biasing force to the header board and the header mount downward toward a floor of the tray portion to engage the stem with the wall of the tray portion to couple the header mount to the tray portion in the extended display position.

8. The display system according to claim 1, further comprising an external casing which encloses the system and provides a retention force to the header board to hold the display in the retracted shipping position.

9. The display system according to claim 8, wherein the header board is configured to automatically self-deploy from the retracted shipping position to the extended display position with the external casing removed.

10. The display system of claim 1 wherein the actuator further comprises a center portion extending between two spaced apart apertures across the display header and the two opposing ends extending outwardly from rear of the display header.

* * * * *